E. T. LORIG AND H. G. McILVRIED.

COLD ROLL FEEDING MECHANISM.

APPLICATION FILED JULY 16, 1921.

1,427,002.

Patented Aug. 22, 1922.

Witnesses:
Edwin Trueb

Inventors:
EDWIN T. LORIG and
HOWARD G. McILVRIED.
by: D. Anthony Usina
their Attorney.

E. T. LORIG AND H. G. McILVRIED.

COLD ROLL FEEDING MECHANISM.

APPLICATION FILED JULY 16, 1921.

1,427,002. Patented Aug. 22, 1922.

Witnesses:
Edwin Trueb

Inventors:
EDWIN T. LORIG and
HOWARD G. McILVRIED.
by: D. Anthony Usina
their Attorney.

E. T. LORIG AND H. G. McILVRIED.

COLD ROLL FEEDING MECHANISM.

APPLICATION FILED JULY 16, 1921.

1,427,002. Patented Aug. 22, 1922.

Witnesses:
Edwin Trueb

Inventors:
EDWIN T. LORIG and
HOWARD G. McILVRIED.
by: D. Anthony Usina
their Attorney.

E. T. LORIG AND H. G. McILVRIED.

COLD ROLL FEEDING MECHANISM.

APPLICATION FILED JULY 16, 1921.

1,427,002. Patented Aug. 22, 1922.

Witnesses:
Edwin Trueb

Inventors:
EDWIN T. LORIG and
HOWARD G. McILVRIED.
by: D Anthony Usina
their Attorney.

E. T. LORIG AND H. G. McILVRIED.
COLD ROLL FEEDING MECHANISM.
APPLICATION FILED JULY 16, 1921.

1,427,002. Patented Aug. 22, 1922.
6 SHEETS—SHEET 5.

Witnesses:
Edwin Trueb

Inventors:
EDWIN T. LORIG and
HOWARD G. McILVRIED.
by: D. Anthony Usina
their Attorney.

E. T. LORIG AND H. G. McILVRIED.

COLD ROLL FEEDING MECHANISM.

APPLICATION FILED JULY 16, 1921.

1,427,002. Patented Aug. 22, 1922.

Witnesses:

Edwin Trueb

Inventors:

EDWIN T. LORIG and

HOWARD G. McILVRIED.

by:

D. Anthony Usina their Attorney

UNITED STATES PATENT OFFICE.

EDWIN F. MORGAN AND HOWARD G. MCILVRIED, OF PITTSBURGH, PENNSYLVANIA, ASSIGNORS TO AMERICAN SHEET AND TIN PLATE COMPANY, OF PITTSBURGH, PENNSYLVANIA, A CORPORATION OF NEW JERSEY.

COLD-ROLL FEEDING MECHANISM.

1,427,002. Specification of Letters Patent. Patented Aug. 22, 1922.

Application filed July 13, 1921. Serial No. 485,212.

*To all whom it may concern:*

Be it known that we, EDWIN F. MORGAN and HOWARD G. MCILVRIED, citizens of the United States, and residents of Pittsburgh, in the county of Allegheny and State of Pennsylvania, have invented certain new and useful Improvements in Cold-Roll Feeding Mechanism, of which the following is a specification.

This invention relates to automatic feeding devices for sheets or plates, and while not limited thereto relates particularly to a device for feeding metal plates and sheets to cold rolls, and has for its principal object the provision of a feeder of this class that will be entirely automatic and that will follow as closely as possible the feeding movement followed in hand feeding, i. e., a vertical and transverse movement.

Another object is to provide means to separate the sheets as same is lifted from a pack.

Other objects and advantages will be more fully brought out in the following specification and illustrated in the accompanying drawings, in which.

Figures 1, 2:
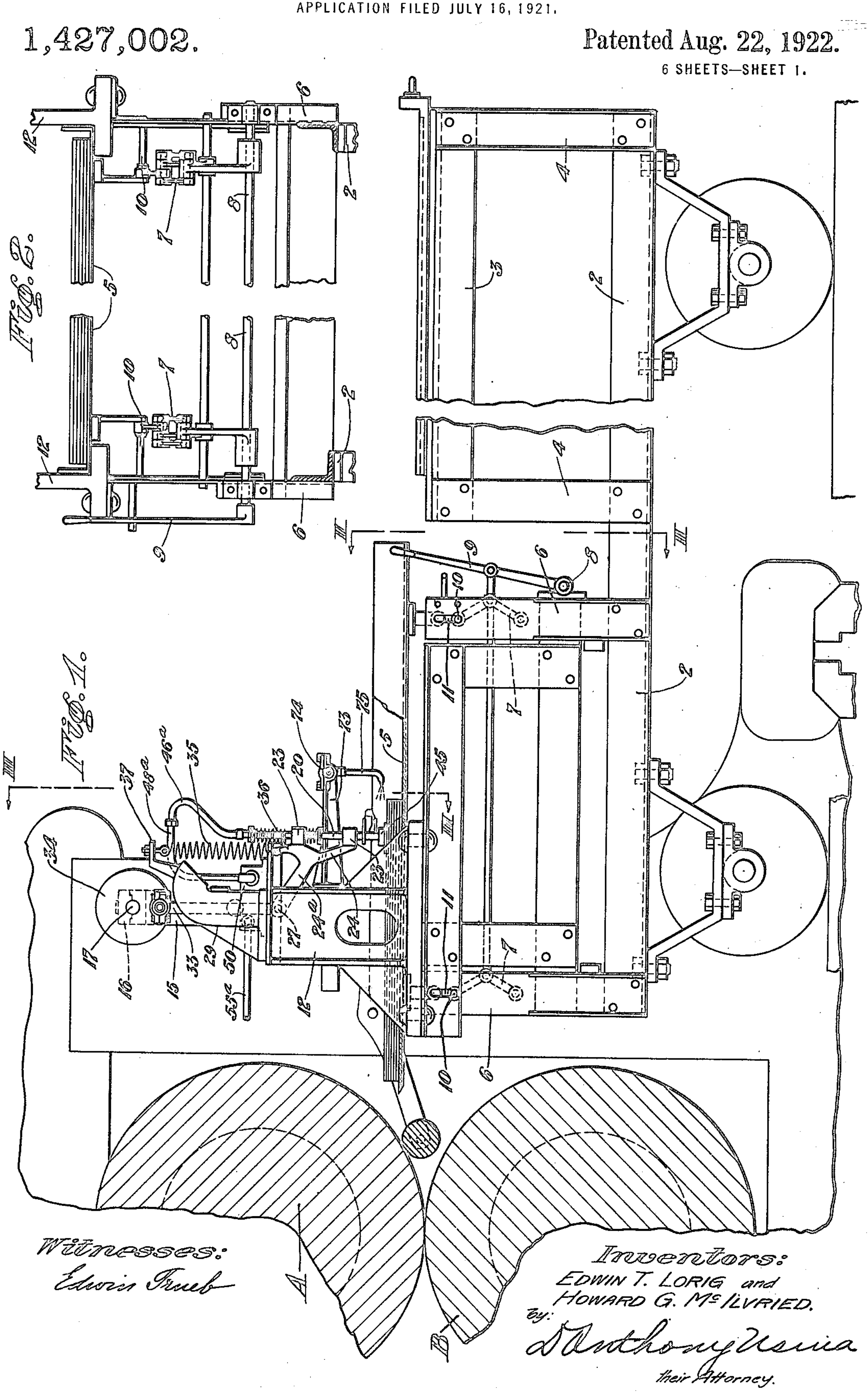
Figure 1 is a sectional side elevation, partly in section, of an automatic feeder embodying this invention.
Figure 2 is a sectional end elevation on the line II—II of Figure 1.
Figure 3:
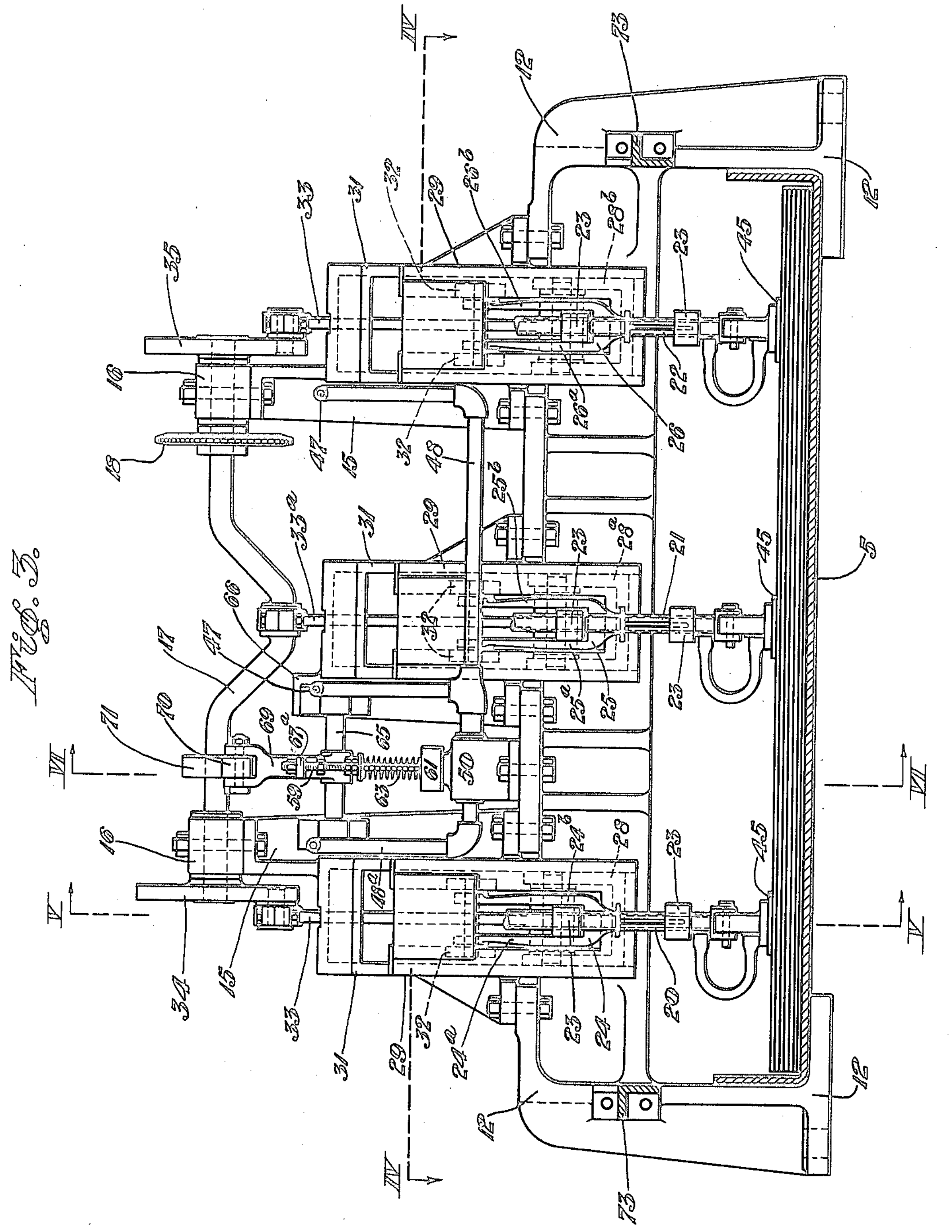
Figure 3 is a sectional end elevation on an enlarged scale, the section being taken on the line III—III of Figure 1.
Figure 4:
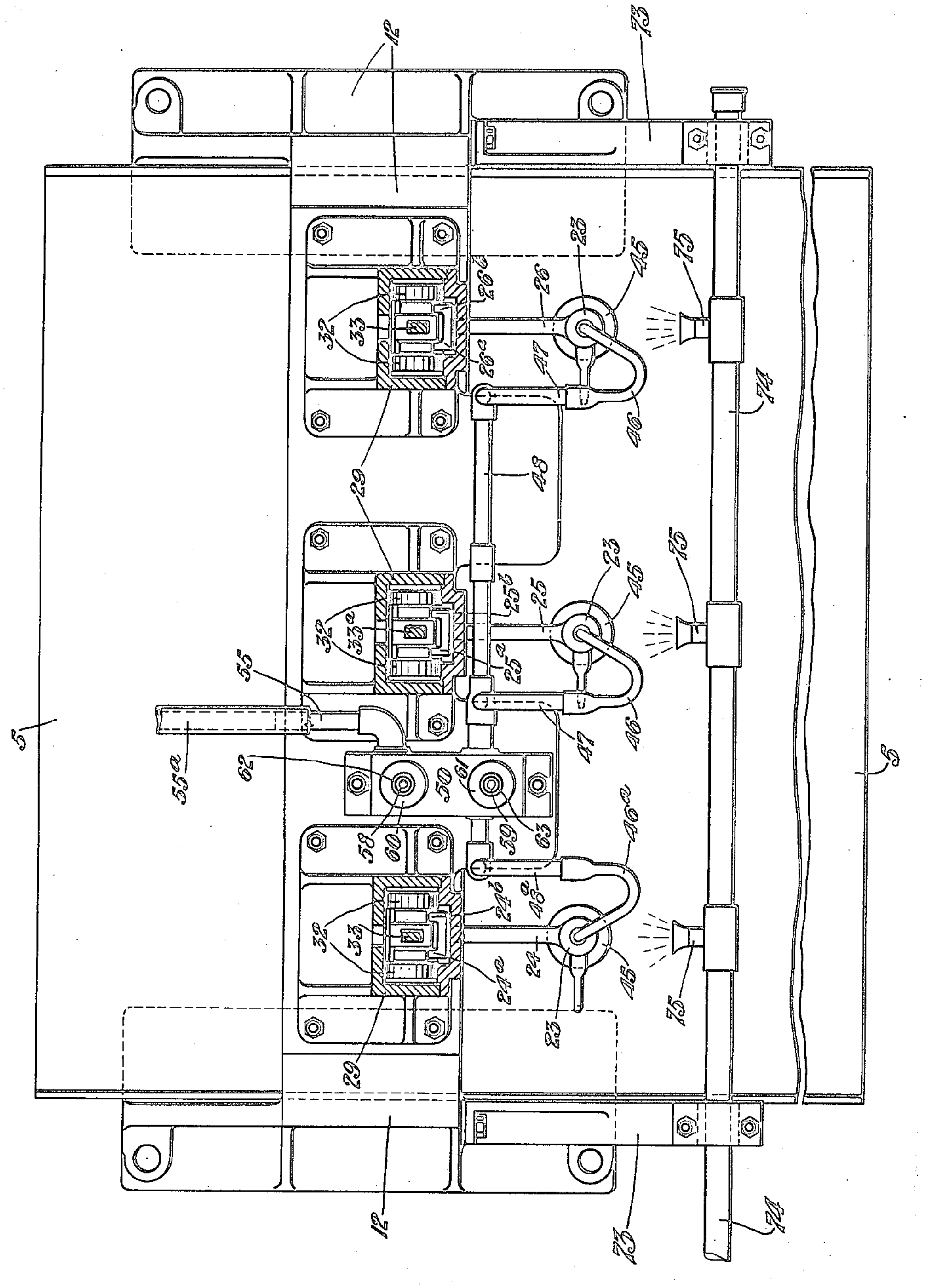
Figure 4 is a sectional plan on the line IV—IV of Figure 3.
Figure 5:
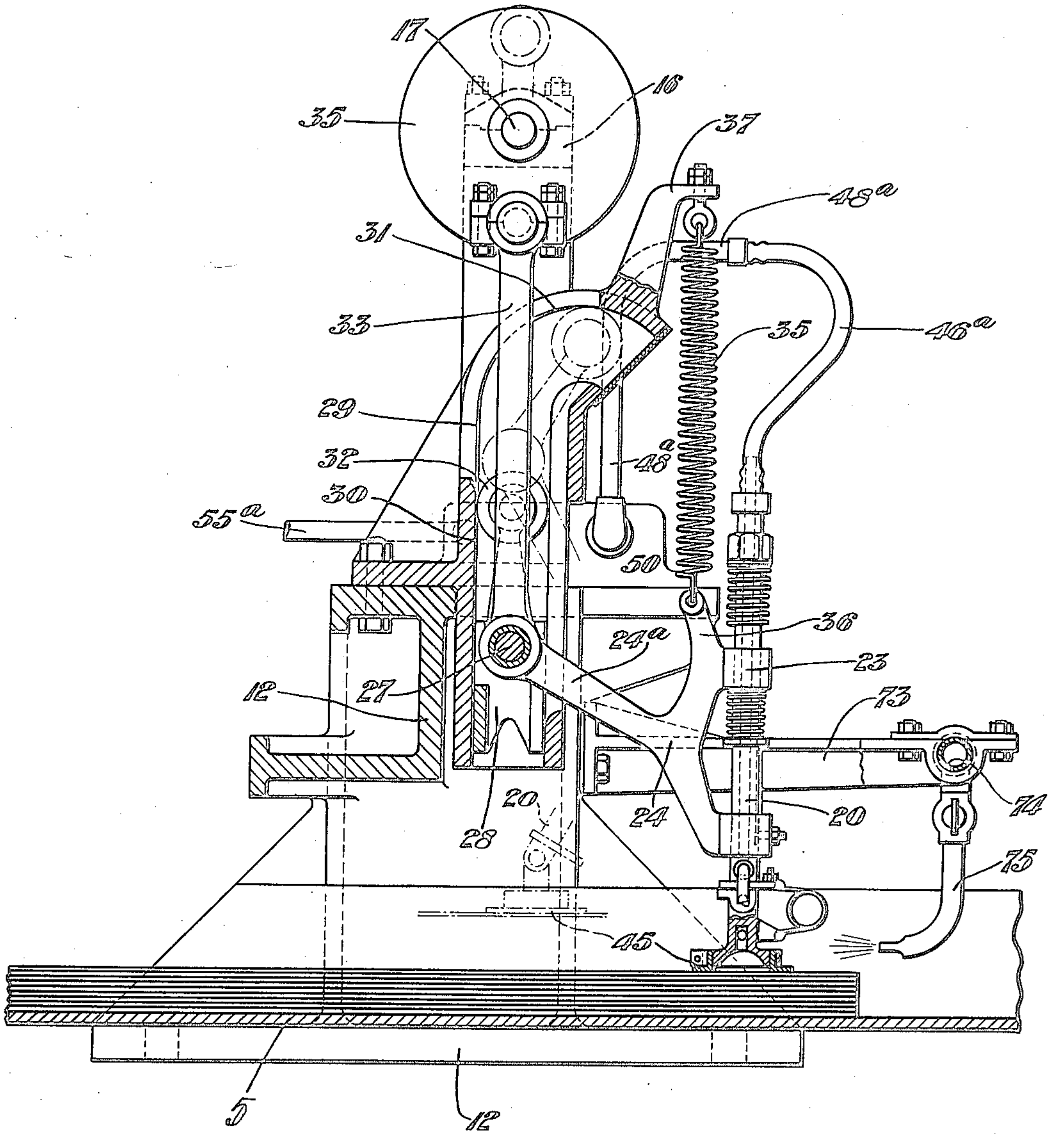
Figure 5 is a sectional elevation on the line V—V of Figure 3.

Referring more particularly to the drawings, the letters A and B designate the cold rolls through which metal plates are adapted to be fed by the automatic feeder which is mounted on a wheeled truck 2 to facilitate its movement into and out of operative position relative to the rolls.

A rigid or permanent platform or table 3 is mounted on uprights 4 above the rear half of the truck, and a vertically adjustable platform or table 5 is supported in suitable operating mechanism mounted in uprights 6 above the forward half of the truck under the feeder mechanism. The table 5 is adjusted vertically by jack mechanism 7 connected to operating shaft 8 journaled in the upper part of uprights 6 and having a hand operating lever 9 secured to one of its ends. The table 5 is held in vertical alinement by means of guide lugs 10 which project through slots 11 in the uprights 6.

The feeder mechanism is supported above the table 5 by a frame structure 12. Suitable bearing standards 15 are secured to the frame 12 and are provided with bearings 16 at the upper ends thereof. A main drive shaft 17 is journaled in the bearings 16 and is provided with a sprocket 18 adapted to be connected by a drive chain to a motor or other source of power (not shown).

A plurality of lifting arms 20, 21 and 22 are each mounted for yielding vertical movement within sleeves 23 carried on one end of operating bell crank levers 24, 25 and 26. The levers 24, 25 and 26 are all divided from a point forward of the bench connection, forming arms 24ª, 24ᵇ, 25ª, 25ᵇ and 26ª, 26ᵇ respectively. Each of the levers 24, 25 and 26 is pivoted intermediate its ends at the bend thereof on pin 27 secured in cross heads 28, 28 and 28ª, respectively, connected for sliding movement within guide arms 29. The guide arm 29 comprises a vertical portion 30 and a curved upper portion 31. The free ends of the arms 24ª, 24ᵇ, 25ª, 25ᵇ and 26ª, 26ᵇ of the respective bell crank levers have rollers 32 journaled thereon adapted to ride on the inner face of the guide arm 29.

The cross heads 28 and 28ª are adapted to be reciprocated within the guide members 29 by connecting rods 33, which have their lower ends pivotally connected to the pin 27 in the cross heads 28 and 28 and have their upper ends pivoted eccentrically to cranks 34 and 35, respectively, connected on the opposite ends of the drive shaft 17. The cross head 28ª is adapted to be reciprocated within its guide member 29 by a connecting rod 33ª, which has its lower end pivotally connected to the pin 27 in the cross head 28ª and has its upper end connected to a crank portion of the drive shaft 17.

The bell crank levers 24, 25 and 26 are spring tensioned by springs 35 having one end connected to lugs 36 on the levers and the other end adjustably connected to lugs 37 projecting from the upper ends of cam members 29.

As the shaft 17 is rotated the connecting rods 33 and 33ª will pull the cross heads 28, 28ª, and 28ᵇ upwardly along their respective cam members 29. As the cross heads move upwardly the levers 24, 25 and 26 will be drawn upwardly in a substantially vertical plane, since they are connected to pins 27 secured in the cross heads 28, 28ª and 28ᵇ. However, as the cross heads advance, the rollers 32 on the arms 24ª, 24ᵇ, 25ª, 25ᵇ, and 26ª, 26ᵇ of the levers 24, 25, and 26, will be forced around the curved head portion of the guide cam members 29, thus rocking the levers 24, 25, and 26 around their respective pins 27, and moving the lifting arms 20, 21, and 22 forward. Thus a vertical and forward or transverse movement is automatically obtained which is very much the same movement obtained when sheets are fed by hand.

Figure 6:
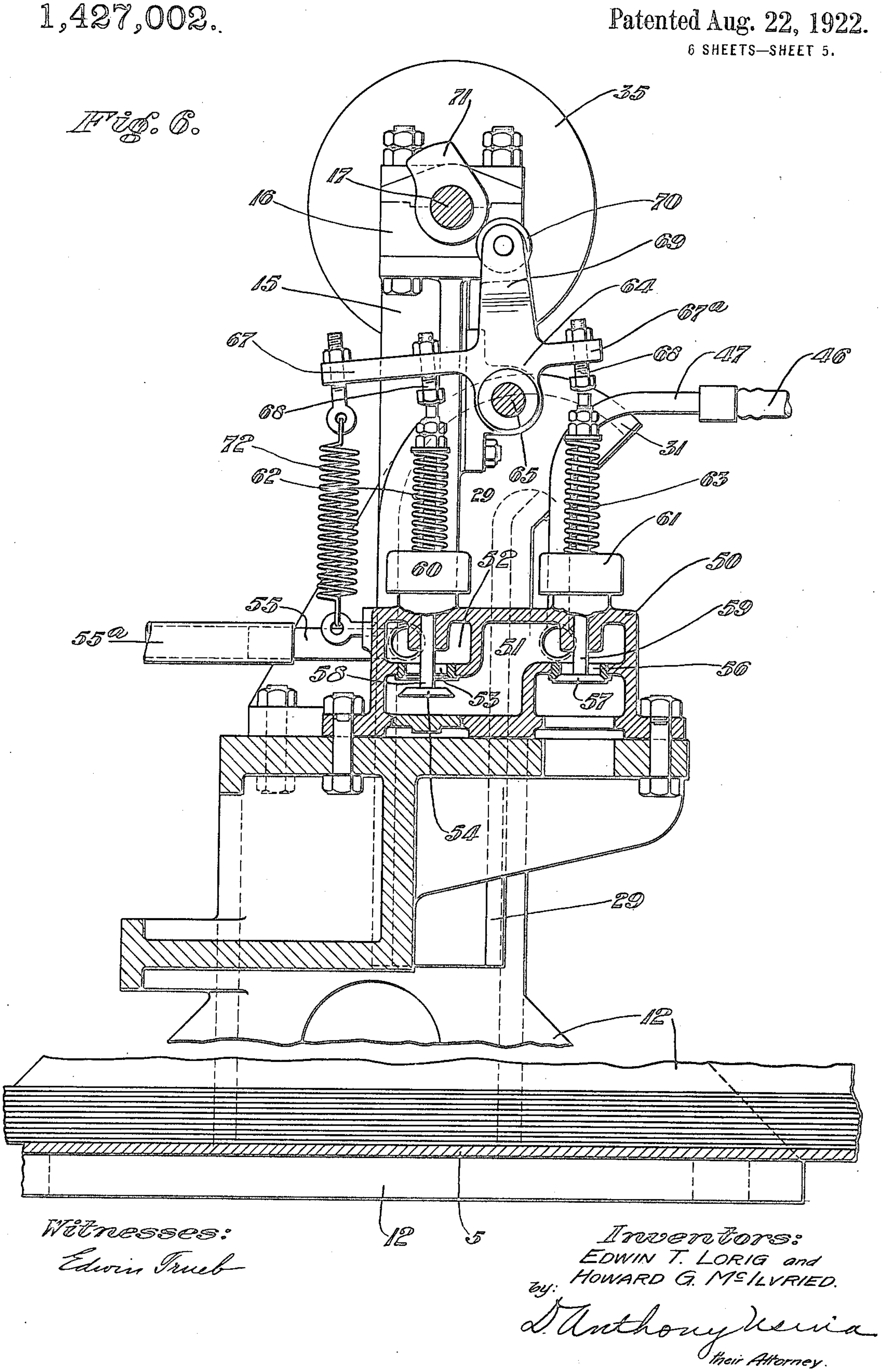
Figure 6 is a sectional elevation on the line VI—VI of Figure 3.

Each of the lifting arms 20, 21 and 22 has a vacuum cup 45 pivoted on its lower end. The cups 45 on the arms 21 and 22 are connected by flexible tubing 46 with branches 47 of a suction conduit 48, which is connected through one side of a valve casing 50 into a chamber 51. A second chamber 52 is formed in the valve casing 50 and has a port 53 opening into the chamber 51 controlled by a valve 54. The vacuum cup 45 on the lifting arm 20 is connected by a flexible tubing 46ª with a short conduit 48ª communicating through the opposite side of the valve casing 50 into the chamber 51. The chamber 52 is provided with a suction inlet which is connected by a pipe 55 and flexible tubing or hose 55ª with a vacuum producing device such as shown in Figure 6.

The chamber 51 of the valve casing has a port 56 opening to the atmosphere and controlled by a valve 57. Both valves 54 and 57 have their stems 58 and 59, respectively, extending upwardly through suitable stuffing boxes 60 and 61, respectively, in the valve casing 50, and springs 62 and 63 are mounted on the stems 58 and 59, respectively, to normally hold the valves 54 and 57 seated.

A rocker head 64 is mounted on a shaft 65 journaled in suitable bearings on one of the standards 15 and a second standard 66. The head 64 has transverse valve operating arms 67 and 67ª provided with adjustable valve contactors 68, and a vertical lever arm 69 having a roller 70 journaled in its upper end. A cam 71 is mounted on the drive shaft 16 and adapted to strike the roller 70 on the lever 69 to rock the head 64 thereby operating the valves 54 and 57. A tension spring 72 has one end secured to the arm 67 and its other end secured to an eye threaded into the valve casing 50 so as to maintain a pull on the head 64 and cause the roller 70 on lever arm 69 to constantly ride on the face of the cam 71.

The cam 71 is so shaped and positioned on the shaft 16 that it will rock the rocking head 64 to close the valve 54 and open the valve 57, thereby opening the chamber 51 of the valve casing 50 to the atmosphere at the instant the feeder arm is in its extreme forward or feeding position. The opening of the chamber 51 to the atmosphere at this instant will break the vacuum cups 45 thereby releasing the plate carried thereby.

A pair of horizontal supports 73 extend rearwardly from the frame 12 and an air blast pipe 74 is secured therein and provided with nozzle branches 75 which extend downwardly to a point slightly below the level to which the plates to be lifted are raised. One end of the pipe 74 is adapted to be connected to a source of air supply such as the exhaust or compressed air pipe 83 of the compressor shown in Figure 7.

Figure 7:
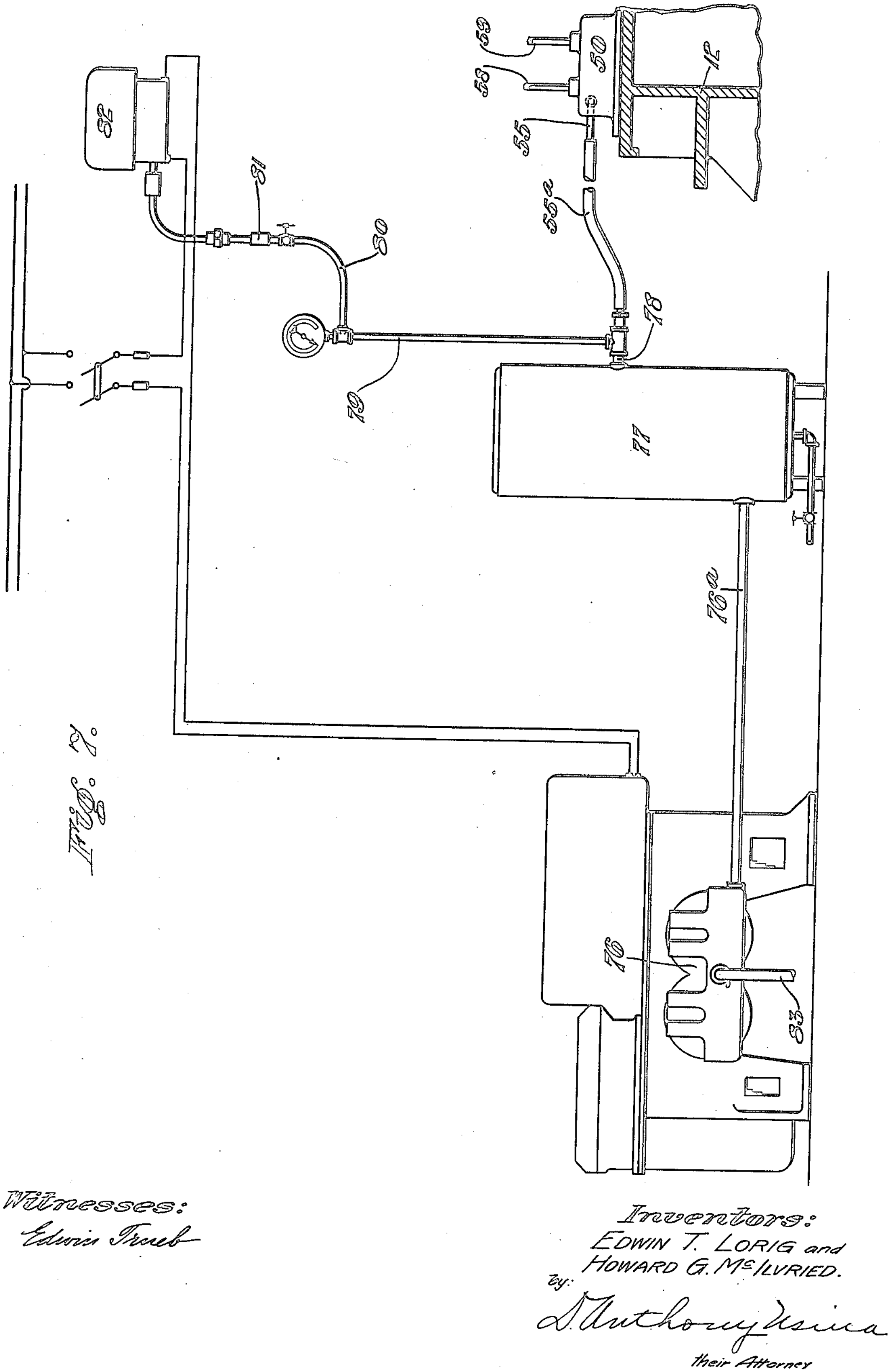
Figure 7 is a diagrammatic elevation of the mechanism used in forming a vacuum in the lifting arms.

In Figure 7 we have shown one group of mechanism for producing the vacuum in vacuum cups 45 for furnishing the forced air blast through the nozzle pipes 75 on the pipe 74. In this figure the numeral 76 designates a motor driven air cooled compressor having an inlet or suction pipe 76ª connecting the inlet port of the compressor with a vacuum tank 77 which has an inlet pipe 78 leading therefrom to which the flexible pipe or hose 55ª leading to the valve chamber 52 is connected. A branch pipe 79 leads from the pipe 78 to a vacuum gage, and a branch 80 leads from the pipe 79 through an air strainer 81 to a governor 82 adapted to control the electrical circuit to the compressor motor.

The discharge of compressed air from the compressor 76 passes out through a discharge pipe 83 which may be connected in any suitable manner, as by flexible tubing with the air blast pipe 74.

In the operation of this feeder, a pack of plates is placed on the table 5. Power is applied to the shaft 17 to rotate the same, and the compressor 75 is then started in operation and the lifting arms 24 with their vacuum cups 45 will be forced down against the pack of plates. The valve 57 in the valve casing 50 will be closed and the valve 54 open, therefore a suction will be created through the cups 45 which will cause a partial vacuum as the cups engage the uppermost plate of the pack. The lifting arms 24 after engaging the upper plate will move upward and forward or vertically and transversely until the plate is engaged between the rolls A and B. As the plate is engaged between the rolls A and B, the cam 71 will engage the roller 70 on the lever 69 on the rocking head 64, closing valve 54 and opening valve 57 to the atmosphere, thus breaking the vacuum and releasing the plate.

The shaft 17 will continue to rotate and the lifting arms 24 will be returned to their starting position to engage another plate, and as the lifting arms approach their starting position the cam 71 will permit the rocking head 64 to resume its starting position, closing valve 57 and opening valve 54 so as to again cause a suction through the vacuum cups 45 to pick up another plate.

While we have described one embodiment of our invention in detail it will be understood that such embodiment is only illustrative of one form of our invention, and, therefore, we do not wish to be limited thereto, since various modifications within the scope of the appended claims will readily suggest themselves to those skilled in the art.

We claim:—

1. In an automatic plate feeder, a lifting arm having means for adhesively engaging and holding a plate, and means for moving said lifting arm vertically and transversely, said means including a guide cam, a cross head in said guide cam, a crank arm pivoted on a pin in said cross head and having one end secured to said lifting arm, means for raising said cross head vertically in said cam guide, and means for rocking said crank arm about said pin.

2. In an automatic plate feeder, a lifting arm having means for adhesively engaging and holding a plate, means for moving said lifting arm vertically and transversely, said means including a rigid guide cam, a cross head mounted for sliding movement in said guide cam, a crank arm pivoted on a pin secured in said cross head, said crank arm having one end connected to said lifting arm and its other end provided with rollers adapted to travel within said guide cam, means for raising said cross head within said cam, and means for releasing the plate from said lifting arm when said arm is in a predetermined position.

3. In an automatic plate feeder, a lifting arm having a vacuum cup thereon for engaging and holding a plate, means for moving said lifting arm vertically and transversely, said means including a rigid guide cam, a cross head mounted for sliding movement in said guide cam, a crank arm pivoted on a pin secured in said cross head, said crank arm having one end connected to said lifting arm and its other end provided with rollers adapted to travel within said guide cam, a drive shaft, a connecting rod having one end ecentrically connected to said shaft and its other end pivotally mounted on said cross head.

4. In an automatic plate feeder, a lifting arm having a vacuum cup thereon for engaging and holding a plate, means for moving said lifting arm vertically and transversely, said means including a rigid guide cam, a cross head mounted for sliding movement in said guide cam, a crank arm pivoted on a pin secured in said cross head, said crank arm having one end connected to said lifting arm and its other end provided with rollers adapted to travel within said guide cam, a drive shaft, a connecting rod having one end eccentrically connected to said shaft and its other end pivotally mounted on said cross head, valves for controlling the suction to said vacuum cup, and a cam mounted on said drive shaft adapted to operate said valves, said cam being so shaped and positioned on said shaft that it will operate said valves to open said cup to the atmosphere when said lifting arm is in a predetermined position, thereby releasing the plate carried by said cup.

5. In an automatic plate feeder having a vertically adjustable plate support, a plurality of lifting arms having vacuum cups on their lower ends for engaging and holding a plate, means for moving said lifting arms vertically and transversely, said means including a rigid guide cam for each of said lifting arms, a cross head slidably mounted in each of said guide cams, crank arms pivoted on pins in each of said cross heads, said lifting arms being resiliently connected to one end of said crank arms for vertical movement, and the other end of said crank arms being provided with rollers adapted to travel within the respective guide cams, a drive shaft, connecting rods for each of said cross heads, said connecting rods having one end eccentrically connected to said drive shaft and the other end pivotally connected to said pins in said cross heads, valves for controlling the suction to said vacuum cups, and a cam mounted on said drive shaft adapted to operate said valves to open said cups to the atmosphere when said lifting arm is in a predetermined position.

In testimony whereof we have hereunto set our hands.

EDWIN T. LORIG,
HOWARD G. McILVRIED.